United States Patent [19]

Scott et al.

[11] Patent Number: 4,954,143
[45] Date of Patent: Sep. 4, 1990

[54] GAS SEPARATION

[75] Inventors: Graham W. Scott, Northwich; Paul Gough, Runcorn; Brian N. Hendy; Michael B. Cinderey, both of Middlesbrough, all of England

[73] Assignee: Imperial Chemical Industries PLC, London, England

[21] Appl. No.: 384,059

[22] Filed: Jul. 24, 1989

Related U.S. Application Data

[63] Continuation of Ser. No. 148,099, Jan. 26, 1988, abandoned, which is a continuation of Ser. No. 865,023, May 20, 1986, abandoned.

[30] Foreign Application Priority Data

May 21, 1985 [GB] United Kingdom ............... 8512764

[51] Int. Cl.$^5$ .................... B01D 53/22; B01D 71/68
[52] U.S. Cl. ............................... 55/16; 55/68
[58] Field of Search ..................... 55/16, 68, 158

[56] References Cited

U.S. PATENT DOCUMENTS

| | | | |
|---|---|---|---|
| 3,735,559 | 5/1973 | Salemme | 55/16 |
| 3,780,496 | 12/1973 | Ward, III et al. | 55/16 |
| 4,157,960 | 6/1979 | Chang et al. | 55/16 X |
| 4,171,017 | 10/1979 | Klass | 55/16 X |
| 4,209,582 | 6/1977 | Ishii et al. | 55/16 X |
| 4,228,205 | 10/1980 | Hudecek et al. | 55/16 X |
| 4,427,419 | 1/1984 | Li | 55/16 |
| 4,444,662 | 4/1984 | Conover | 55/16 X |
| 4,461,847 | 7/1984 | Hudecek et al. | 55/16 X |
| 4,468,500 | 8/1984 | Malon et al. | 55/16 X |
| 4,468,503 | 8/1984 | Zampini et al. | 55/16 X |
| 4,472,175 | 9/1984 | Malon et al. | 55/16 |
| 4,515,761 | 5/1985 | Plotzker | 55/16 X |
| 4,518,399 | 5/1985 | Croskell et al. | 55/16 |
| 4,568,579 | 2/1986 | Watson | 55/16 X |
| 4,586,939 | 5/1986 | Li | 55/16 |
| 4,596,860 | 6/1986 | Percec et al. | 55/16 X |
| 4,717,395 | 1/1988 | Chiao | 55/16 |

FOREIGN PATENT DOCUMENTS

| | | |
|---|---|---|
| 0001879 | 5/1979 | European Pat. Off. |
| 0008894 | 3/1980 | European Pat. Off. |
| 0008895 | 3/1980 | European Pat. Off. |
| 0041780 | 12/1981 | European Pat. Off. |
| 0142973 | 5/1985 | European Pat. Off. |
| 0145305 | 6/1985 | European Pat. Off. |
| 0182506 | 5/1986 | European Pat. Off. |

*Primary Examiner*—Robert Spitzer
*Attorney, Agent, or Firm*—Cushman, Darby & Cushman

[57] ABSTRACT

A mixture of two or more gases is contacted with a surface of a gas separation membrane and a gas having a different composition is removed from the vicinity of an opposite surface of the membrane, where the membrane is formed from a sulphonated polyarylsulphone or polyarylketone. The membrane may be a dense film or may be an asymmetric membrane. The process is particularly suitable for the separation of hydrogen from a hydrogen/nitrogen mixture when separation factors considerably in excess of 100 may be achieved together with an acceptable permeability. The membrane is preferably formed from a sulphonated polyarylethersulphone, for example one having repeat units of the formula $$[(Ph^1-O)_n-Ph^1-SO_2]$$

where $Ph^1$ is a phenylene residue and at least some of the groups $Ph^1$ are sulphonated and n is 1 or 2 and the value can differ along the polymer chain. Divalent metal salts give membranes of high permeability which have a good separation factor.

24 Claims, 1 Drawing Sheet

GAS SEPARATION

This is a continuation of patent application No. 07/148,099, filed Jan. 26, 1988, now abandoned, which was a continuation of patent application No. 06/865,023, filed May 20, 1986, now abandoned.

The present invention relates to the separation of gases from mixtures thereof and, in particular, to the separation of gases using a gas separation membrane.

In a number of commercial processes, one of the products or by-products is a mixture of gases and it is desirable to recover at least one of the gases as an essentially pure material, for example it is desirable to separate hydrogen from waste gases in order to recover the hydrogen which may then be used in a petroleum cracker or for the production of ammonia. Another gas separation process which is desirable is separation of carbon dioxide from methane, for example in the mixed gases from an oil well, to improve the calorific value of the remaining methane or to recover the carbon dioxide for reinjection into an oil well.

One technique of separating gases is by the use of gas permeable membranes. In such a separation process the mixture is contacted with one surface of the membrane and a gas having a different composition is removed from the vicinity of an opposite surface of the membrane. The gas removed from the vicinity of the opposite surface has a different proportion of at least one of the components compared to the original gas mixture. To obtain a gas of sufficient purity, it may be necessary to repeat the contacting with, and permeation through, a membrane and the desired degree of purity may be achieved only after several successive repeats of the contacting and permeation steps.

Alternatively, the feed gas may be fed in turn to a number of membrane cells and the permeating gas from each cell combined to maximise the recovery of the faster permeating species. A further alternative is to use a combination of both parallel and series arrangement of cells, for example by passing the feed gas in turn to a number of membrane cells, combining the permeating gas from each cell and passing the combined permeated gases to a further cell and recovering the permeate from this further cell.

Whilst it may be possible to improve the separation factor, by which is meant the relative rates at which two different gases pass through the membrane, such an improvement may be associated with a decrease in the rate at which the gases permeate the membrane. It will be appreciated that the preferred membranes are those which provided a high separation factor together with a high rate of permeation.

Gas separation membranes which are formed from a polysulphone having the repeating unit A,

A are available commercially. In this formula, Ph represents a paraphenylene group and iPr represents a dimethylmethylene ($—(CH_3)_2C—$) group. In U.S. Pat. No. 4472175, gas separation membranes are descried in which an asymmetric gas separation membrane is treated on one or both surfaces with a Bronsted-Lowry acid. The membrane can be formed from a variety of materials including polysulphones having repeating unit A.

We have now found that membranes showing good separation factors and permeability can be obtained without having to use a post-treatment with a Bronsted-Lowry acid.

According to the present invention there is provided a gas separation process in which a gas feed mixture of two or more gases is contacted with a surface of a gas separation membrane and a gas or a gas mixture having a different composition from that of the gas feed mixture, is removed from the vicinity of an opposite surface of the membrane, where the gas separation membrane is formed from a sulphonated polyarylsulphone or polyarylketone.

The membrane is typically formed from a sulphonated polymer which contains repeating units of the general formula B

B wherein
Ar is a divalent aromatic radical and at least some of the groups Ar are sulphonated; and
Y is $—SO_2—$ or $—CO—$.

The group Ar is preferably a group containing at least two aromatic rings which may be fused together, linked together by a direct bond, or linked together by an aliphatic group, an oxygen or sulphur atom or a sulphone or ketone group.

Preferably the sulphonated polymer is a sulphonated polyarylethersulphone or a sulphonated polyaryletherketone in which the group Ar contains at least two aromatic groups linked together by an oxygen atom. For convenience hereafter, such materials will be referred to as sulphonated polyethersulphones and sulphonated polyetherketones respectively.

Sulphonated polymers of this type include polymers which contain repeating units of the formula C.

C wherein
Y is as defined;
$Ph^1$ represents a phenylene residue, preferably a paraphenylene residue, wherein at least some of the groups $Ph^1$ are sulphonated; and
n is 1 or 2 and the value of n can differ along the polymer chain.

If the group Y is a $—SO_2—$group in the sulphonated polymer of formula C, the value of n may be only one or only two, but we prefer to use a copolymer in which the value of n is one for some repeating units and is two for other repeating units, such copolymers being described in European Patent Specification No. 8894.

The preferred materials have repeating units of the formula D:

D together with the repeating units of the formula E

E wherein
$Ph^2$ represents a phenylene residue, preferably a paraphenylene residue;
$Ph^3$ represents a phenylene residue, preferably a paraphenylene residue, having one or two groups $—SO_3M$;
M is a hydrogen atom, a metal atom and/or a group $NR_4$, wherein the groups M may be the same or different and the proportion of the groups M is sufficient to combine with the unsatisfied valencies of the group —SO₃; and R is a hydrogen atom or an alkyl group.

The sulphonated polyethersulphone may also include a proportion of unsulphonated copolymer having repeating units of the formula F

F together with the repeating units of the formula D and the formula E, wherein Ph² is as defined.

In the repeating units of the formula D, when Ph³ is an ortho-or para- phenylene residue, there is typically only one group —SO₃M whereas, when Ph³ is a meta-phenylene residue, there are typically two groups —SO₃M. When Ph³ is an ortho-phenylene residue, the —SO₃M group is located in a position which is para- to one ether group and meta- to the other ether group, any further sulphonation occurring to locate the —SO₃M in positions meta- to each other. When Ph³ is a para-phenylene residue, the —SO₃M group is located in a position ortho- to one ether group and meta- to the other ether group. When Ph³ is a meta-phenylene residue, the —SO₃M groups are located in the position ortho- to one ether group and para- to the other ether group.

The sulphonated copolymers may be prepared by sulphonating a copolymer consisting of repeating units E and F. The sulphonation is readily effected by dissolving the copolymer in concentrated sulphuric acid (98% w/w) at ambient temperature and agitating the mixture for a sufficient time for sulphonation of essentially all of the sub-units —O—Ph²—O—in the repeat units of formula F. The copolymers which are subjected to sulphonation suitably have from 1 to 99 mole % of units F and correspondingly from 99 to 1 mole % of units E, and especially from 2.5 to 67 mole % of units F and correspondingly from 97.5 to 33 mole % of units E. Sulphonation is desirably effected to convert at least 90% of the units F to the units D. The sulphonation process is described in European Patent Specification No. 8894.

The sulphonated polyethersulphones are polymeric materials of high molecular weight such that the reduced viscosity (RV) of the polymer,(measured as a 1% by weight solution of the polymer in dimethylformamide at 25° C.) is at least 0.2 and preferably at least 0.4. The polymer may be such as to give an RV of up to 2.5, but it is generally preferred that the RV of the polymer does not exceed 2.0.

The copolymer which is to be sulphonated to produce the material containing repeat units D, E and possibly F, is conveniently prepared using a mixture of monomers to produce the desired repeating units E and F and hence the units E and F are distributed in a random fashion along the polymer chain. Hence, in the sulphonated copolymer, the units D, and E, and F if present, are also distributed in a random fashion along the polymer chain.

The sulphonated polyethersulphone contains the groups —SO₃M, where M may be hydrogen, a metal atom or a group NR₄. Sulphonated polyethersulphones in which M is a divalent metal atom, particularly an alkaline earth metal, are the subject of our not prior-published European Patent Application Publication No. 145305, which also discloses a method for the production of such divalent metal salts and the use thereof for the production of asymmetric semi-permeable membranes.

Alternatively, the membrane can be formed from a material of formula C in which the group Y is a ketone group. Sulphonated polyetherketones which may be used include polymers which contain repeating units of the formula G:

G wherein Ph¹ and n are as defined.

The sulphonated polyetherketone may be a material in which the value of n is only one or is only two or in which the value of n differs along the polymer chain and is both one and two at various points along the chain. Thus, the sulphonated polyetherketone may be a material obtained by sulphonating a polyetherketone having only the repeating units

H or only the repeating units J,

J wherein Ph² is as defined

Alternatively, the sulphonated polyetherketone may be obtained by sulphonating a copolymer having both the repeating units H and the repeating units J. In the polyetherketone which is to be sulphonated, it is preferred that the groups Ph² are para-phenylene groups.

Sulphonated polyetherketones which may be used are described in the prior art, for example in European Patent Specification Nos. 8895 and 41780. Thus, it is possible to use the products obtained by sulphonating a polymer having the repeating units of the formula H, optionally together with other repeat units. Sulphonation may be effected by dissolving the polyetherketone in concentrated sulphuric acid (98% w/w) and agitating the solution until the polymer has been sulphonated to a desired extent. The sulphonation in concentrated sulphuric acid may be carried out at ambient temperature or at an elevated temperature, for example at least 50° C., depending on the polyetherketone to be sulphonated.

The polyetherketone which is sulphonated is preferably one containing the repeating units of the formula H only or a copolymer containing the repeated units of the formula H together with up to 67% mole of comonomer units of the formula K

K or 50% mole of comonomer units of the formula

L where

Ph² and Y are both as defined.

In the sulphonation process, sulphonation most readily occurs on the sub-group —O—Ph²—O—in the repeating units of formula H, and especially the repeating units of formula L. The preferred polyetherketones which are sulphonated contain at least 50 mole % of the repeating units of formula H and are especially homopolymers of the repeating units H or copolymers of the repeating units H and repeating units K, particularly when the group Y is —CO—.

Preferred sulphonated polyketones contain the repeating units M together with the repeating units H and optionally also the repeating units K, wherein Ph$^2$ and Ph$^3$ are both as defined, The repeating units H are present due to incomplete sulphonation of the polymer containing the repeating units H. Preferably, the sulphonated polymer is one in which the repeating units M are at least 35 mole % and not more than 80 mole %, and preferably 40 to 70 mole %, of the total of the repeating units M, and the repeat units H. In the group —SO$_3$M, M is typically hydrogen since this is the usual product of the sulphonation step.

The sulphonated polyetherketones are polymeric materials of high molecular weight, as indicated by the reduced viscosity (RV) or inherent viscosity (IV) of the polymer. The polymers, particularly those having a low degree of sulphonation are not readily soluble in many organic solvents and hence the RV or IV of such polymers is measured in concentrated sulphuric acid (98 % w/w). Preferably, the polymers having a low degree of sulphonation have an IV (measured at 25° C. in a 0.1% w/w solution of the polymer in concentrated sulphuric acid) of at least 0.2 and preferably of at least 0.4. The IV of such polymers typically does not exceed 2.5 and especially does not exceed 2.0. Preferred sulphonated polyetherketones have a degree of sulphonation which is such that the sulphonated polyetherketone is soluble in organic solvents such as dimethylformamide. Such sulphonated polyetherketones preferably have an RV (measured at 25° C. in a 1.0 % w/w solution of the polymer in dimethylformamide) of at least 0.2 and preferably of at least 0.4. The RV of such polymers preferably does not exceed 2.5 and especially does not exceed 2.0.

The sulphonated polyetherketones are conveniently prepared by sulphonation of polyetherketones using the procedures described herein and in European Patent Specification Nos. 8895 and 41780. The polyether ketones which are sulphonated are suitably crystalline polymers containing the repeating units H alone or together with other repeating units and having an IV (measured at 25° C. in a 0.1% w/w solution of the polymer in concentrated sulphuric acid) of at least 0.7. Such polymers are more fully described in European Patent Specification No. 1879.

In the sulphonated polyetherketone containing the repeating units of the formula M, when Ph$^3$ is a para- or para- phenylene residue, there is typically only one group —SO$_3$M whereas when Ph$^3$ is a meta-phenylene residue there may be one or two groups —SO$_3$M depending on the time and temperature of sulphonation. When Ph$^3$ is an ortho-phenylene residue, the —SO$_3$M group is located in a position which is para- to one ether group and meta- to the other ether group, any further sulphonation occurring to locate the —SO$_3$M in positions meta- to each other. When Ph$^3$ is a para-phenylene residue, the —SO$_3$M group is located in a position ortho- to one ether group and meta- to the other ether group. When Ph$^3$ is a meta-phenylene residue, the —SO$_3$M group or groups is or are located in the positions ortho- to one ether group and para- to the other ether group.

We have obtained a useful combination of separation factor and permeability using a membrane formed from a sulphonated polyethersulphone and, in particular, from a sulphonated polyethersulphone containing the repeating units D and E and possibly also some repeating units F. The polymers are conveniently those having a sulphonation ratio of at least 2, for example at least 4, and not more than 20, preferably not more than 15. By "sulphonation ratio" is meant the ratio of the number of unsulphonated phenylene residues in the sulphonated polymer to the number of sulphonated phenylene residues in the sulphonated polymer. The sulphonation ratio is preferably determined by C$^{13}$ nmr, but infra-red techniques may also be used. We have found that titration (which gives a measure of the ion-exchange capacity of the polymer) generally indicates a lower degree of sulphonation than is found by nmr or infra-red and hence titration is a possible, but not a preferred, technique for determining the sulphonation ratio. In the sulphonated polyethersulphone, the group —SO$_3$M may be in the free acid form as —SO$_3$H or may be a salt, for example an ammonium salt or a salt of a metal such as sodium, calcium, barium or a metal of Group VIII of the Periodic Table.

The membrane may be an asymmetric or homogeneous membrane. Alternatively, the membrane may be a composite comprising a porous support layer on which is deposited a separation layer formed from the sulphonated polyarylsulphone or polyarylketone.

Asymmetric membranes may be formed by the procedures described in our not prior-published European Patent Applications Publication No. 142973, 145305 and 182506. More specifically, the sulphonated polymer is dissolved in a solvent mixture, the solution is cast onto a support or is formed into fine hollow fibres by extrusion, some of the solvent mixture is allowed to evaporate and then the mixture is immersed in a coagulation bath.

The solvent mixture used to produce an asymmetric membrane may be one which contains at least three specified components, each of which is a non-solvent or poor solvent for the sulphonated polymer. The composition of the solvent mixture is dependent on particular sulphonated polymer, the molecular weight and the sulphonation ratio thereof and also whether the polymer is in the acid form or in the salt form. The components of the solvent mixture should not react or complex with any of the other components of the solvent mixture nor should there be any reaction or complexing with the sulphonated polymer. Solvent mixtures which may be used to obtain asymmetric membranes include (a) water, 1,4-dioxane and acetonitrile and (b) methanol, chloroform and nitromethane, both of which are useful for the production of asymmetric membranes from sulphonated polyethersulphones containing the repeating units D, E and possibly F, in which the group —SO$_3$M is —SO$_3$H. Alternatively, a solvent mixture of (c) water, 1,4-dioxane and propylene carbonate may be used to produce asymmetric membranes from sulphonated polyethersulphones containing the repeating units D, E and possibly F, in which M is a metal atom, particularly a divalent metal atom such as barium. A solvent mixture of composition (a) can also be used to produce asymmetric membranes from sulphonated polyetherketones containing the repeating units M, optionally together with the repeating units H and/or the repeating units K.

In forming an asymmetric membrane, after casting the solution, or forming hollow fibres from the solution, it is desirable to allow at least partial evaporation of at least one component of the solvent mixture before immersing the product mixture in a coagulation bath. The coagulation bath contains a liquid, or liquid mixture, which is a non-solvent for the sulphonated polymer.

Typically, the coagulation bath contains water or is an aqueous solution of an inorganic salt, for example sodium chloride or sodium nitrate. The temperature of the coagulation bath is generally between $-20°$ C. and $60°$ C., and is preferably below $5°$ C. The coagulation treatment may be between one minute and several hours, for example between 5 and 60 minutes.

After the coagulation treatment, the asymmetric membrane is recovered. If desired, the recovered membrane may be subjected to heat treatment in order to relax the structure. Once prepared, and after any heat treatment, the membrane is preferably washed with distilled water to remove free ionic species. The membrane may be stored in distilled water from which it is removed prior to being installed in the gas diffusion cell. Before use the membrane is dried. Drying of the membrane can be effected using any suitable drying technique. Thus, the membrane may have surface moisture removed by placing between sheets of absorbent material and held between rigid backing sheets and then further dried in an oven at reduced pressure, for example at a pressure of not more than 0.3 bar, and an elevated temperature, for example in the range from $50°$ C. to $100°$ C. The membrane is then installed in the diffusion cell and is degassed, in situ, conveniently at about ambient temperature, for example $10°$ C. to $30°$ C., using a pressure within the gas diffusion cell, on both sides of the membrane, which is less than $10^{-6}$ bar and may be as low as $10^{-7}$ mbar. Degassing is effected for from 2 to 24 hours.

Homogeneous membranes are more readily produced than asymmetric membranes. More specifically a homogeneous membrane can be obtained by dissolving the sulphonated polymer in a liquid which is a solvent for the sulphonated polymer, for example dimethylformamide. This solution may be cast or may be formed into hollow fibres by extrusion. The solvent is allowed to evaporate from the solution to form the membrane. If the material is immersed in a coagulation bath, this will give a degree of asymmetry but this is not the preferred method of producing asymmetric membranes. The membrane thus obtained may be dried using the techniques described herein for drying of asymmetric membranes.

Composite materials may be formed using the technique described for homogenous membranes by casting the solution of the sulphonated polymer onto a porous support from which the deposited membrane is not readily separated once formed.

Whilst homogeneous membranes may be used in accordance with the present invention, these are generally thicker than the dense layer of an asymmetric or composite membrane and, since flux (mass transfer per unit area per unit time) is inversely proportional to thickness and a high flux is desirable, we generally prefer to use asymmetric or composite membranes.

The membranes are used in gas diffusion apparatus in the known manner to effect separation of a desired gas from a gas mixture. Although the materials of the membranes have got good high temperature properties and hence can be used at temperatures substantially above ambient temperature, for example as high as $60°$ C., or even $100°$ C., we prefer to effect the separation process at about ambient temperature, that is $10°$ C. to $30°$ C.

The separation process may be effected with the gas feed at a relatively low pressure, for example less than $0.5$ MNm$^{-2}$, but in order to achieve a high flux of gas through the membrane, substantially higher pressures may be used, for example $20$ MNm$^{-2}$ or even higher.

The gas mixture, under pressure, is passed into the diffusion apparatus in which it comes into contact with one surface of the membrane. The components of the gas mixture permeate through the membrane at different relative rates whereby some separation of the components occurs and the gas mixture which has permeated the membrane is enriched with respect to one of the components. If it is desired to obtain a good recovery of the permeated product, the feed gas mixture may be passed, in turn, through a number of cells and the permeate from all of the cells can be combined. Alternatively, but less preferred, the enriched gas mixture is removed from the vicinity of the opposite surface of the membrane and may be passed as a feed gas to a further diffusion apparatus in which the resulting permeate gas is even further enriched. The process may be repeated a number of times to achieve a desired degree of enrichment. However, permeation occurs with a loss of pressure and if the process is repeated a number of times, repressurisation of the gas may be necessary, which is undesirable commercially. Thus, it is preferred, in such a process, not to use more than six stages of enrichment and not more than one repressurisation stage. The degree of enrichment decreases with each subsequent stage and only a small proportion of the feed gas mixture is recovered. Hence, this alternative multi-stage process is generally not preferred commercially. The two multi-stage processess may be combined by subjecting the combined permeate of the first, preferred, technique, to a further permeation step, as in the second technique.

Using membranes formed from sulphonated polymers we have achieved very satisfactory separation factors, both with asymmetric and homogenous membranes. More specifically, using membranes formed from sulphonated polyethersulphones containing the repeating units D, E and a small proportion of F (less than 10% molar of F relative to the total of repeating units D and E), we have achieved separation factors, relative to nitrogen, of greater than 90, and up to about 200, for hydrogen; between 30 and 75 for carbon dioxide; and between 4 and 11 for oxygen. Furthermore, the rate of permeation through the membrane is not significantly different from that achieved using a membrane formed from the unsulphonated polymer. Hence, the process of the present invention is particularly suitable for the separation and recovery of hydrogen or carbon dioxide from waste gas mixtures containing these gases. The recovered hydrogen or carbon dioxide is sufficiently pure to be recycled and used in processes such as ammonia synthesis, or in refinery operations such as in a petroleum cracker, whilst the carbon dioxide may be reinjected into oil wells or gives a residue of methane having an improved calorific value.

Thus, as one aspect of the present invention a mixture of hydrogen and nitrogen is contacted with a gas separation membrane and a gas enriched in hydrogen is removed from the vicinity of an opposite surface of the membrane wherein the membrane is formed from a sulphonated polyethersulphone containing the repeating units D, E and optionally a small proportion of F. This separation process may be used in an ammonia synthesis plant.

As a further aspect of the present invention a mixture of carbon dioxide and methane is contacted with a gas separation membrane and a gas enriched in carbon dioxide is removed from the vicinity of an opposite surface of the membrane wherein the membrane is formed from a sulphonated polyethersulphone containing the repeating units D, E and optionally a small proportion of F. This technique may be used to obtain gases of increased calorific value by reducing the level of carbon dioxide in the non-permeated gas and may be applied to natural gas, enhanced oil recovery off-gases or land-fill gases.

As yet a further aspect of the present invention a mixture of oxygen and nitrogen is contacted with a gas separation membrane and a gas enriched in oxygen is removed from the vicinity of an opposite surface of the membrane wherein the membrane is formed from a sulphonated polyethersulphone containing the repeating units D, E and optionally a small proportion of F. This technique may be used to obtain an oxygen-enriched gas from air for medical use or to obtain an oxygen-depleted nitrogen gas from air for nitrogen blanketing in processes in which the use of high purity nitrogen is not essential.

The present invention also provides a process wherein a mixture of gases containing hydrogen and hydrocarbon gases is contacted with a gas separation membrane and a gas enriched in hydrogen, and methane if present, is removed from the vicinity of an opposite surface of the membrane wherein the membrane is formed from a sulphonated polyethersulphone containing the repeating units D, E and optionally a small proportion of F. This technique may be applied to gas streams in petrochemical plant and refinery operations.

It should be appreciated that the term "enriched" as used herein does not necessarily mean that the mixture which is enriched contains a major proportion of the enriched component but rather is used to mean that the permeated gas mixture contains a higher proportion of the enriched component than the original gas mixture.

Using membranes formed from multi-valent metal salts of the sulphonated polymer we have found that an increased permeability is generally achieved and the separation factors are very similar to those achieved with the acid form of the sulphonated polymer. By "multi-valent" we mean a valency of at least two.

Thus, according to a further aspect of the present invention, a gas mixture is contacted with a surface of a gas separation membrane and a gas or a gas mixture having a different composition is removed from the vicinity of an opposite surface of the membrane, where the gas separation membrane is formed from a sulphonated polyarylsulphone wherein at least some of the aromatic radicals are sulphonated with a group —$SO_3M'$ where $M'$ is a metal having a valency of at least 2 and is present in a proportion to combine with the unsatisfied valencies of the group —$SO_3$. The metal $M'$ can be a divalent metal and we have obtained satisfactory results when the metal $M'$ is barium, magnesium and cobalt. The membrane is preferably formed from a sulphonated polyethersulphone containing the repeating units D, E and optionally a small proportion of F and containing the groups —$SO_3M'$.

Figure 1:
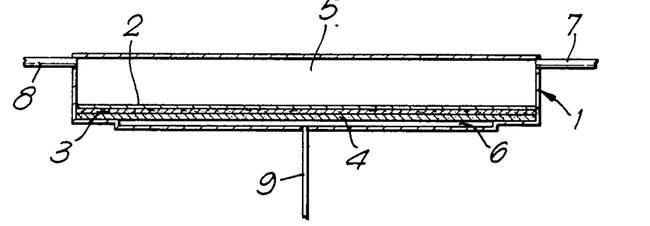
The accompanying drawing is a diagrammatic representation of a diffusion cell which can be used for gas separation in accordance with the present invention.

The cell comprises a closed vessel 1 which is divided into two sections internally by a membrane 2 which is formed from a sulphonated polyarylsulphone or polyarylketone. The membrane 2 is supported by a porous plate in contact with a sheet 3 of porous material, which assists in preventing mechanical deformation of the membrane 2. The membrane 2, sheet 3 and porous plate 4 are clamped at their edges to prevent leaking around the edges. The vessel 1 is divided by the membrane 2 into a large section 5 and a small section 6. The large section 5 is provided with two pipelines 7 and 8 for the supply and removal of gas. The small section 6 is provided with a pipeline 9. The vessel 1 should be capable of withstanding elevated pressures and may be formed from any suitable material particularly a metal such as stainless steel. When using the apparatus, a gas mixture under pressure, for example reformer gas at a pressure of 10 $MNm^{-2}$, is passed into section 5 of the vessel 1 through pipeline 7 and is withdrawn through pipeline 8. The pressure of the gas feed is sufficient to cause gas to permeate through the membrane 2, with a loss of pressure, and the gas which passes through the membrane 2 and into the section 6 contains a higher proportion of hydrogen. The gas is withdrawn from section 6 through the pipeline 9. The pressure of the permeate gas withdrawn from section 6 can be adjusted as desired to control the rate of permeation through the membrane. The apparatus can be operated at ambient temperature (about 25° C.) but higher temperatures may be used. Modifications and variations to the apparatus and/or process may be effected in the manner known to those skilled in the art.

Various aspects of the present invention are illustrated, but not limited, by the following Examples, in which all parts and percentages are by weight unless otherwise indicated.

EXAMPLE 1

A sulphonated polyarylethersulphone copolymer containing 25 mole % of units D and 75 mole % of units E (as defined herein) in which $Ph^2$ and $Ph^3$ are para-phenylene residues and M is a hydrogen atom, having a sulphonation ratio of 8, and a reduced viscosity (as defined herein) of 0.95 was dissolved, at a temperature of 25° C., in a 3:1:1 parts by weight 1,4-dioxane/acetonitrile/water mixture to give a 26% by weight solution of the copolymer in the solvent mixture. The solution was filtered through a gauze with a mesh size of 30 micrometers and then centrifuged at 2000 rpm for 20 to 30 minutes.

The solution was cast on to a glass plate and a film of the desired thickness was formed on the plate with the aid of a brass spreader. After 30 seconds evaporation in air, coagulation of the film was effected by immersion for 30 minutes in an aqueous solution of sodium chloride at about −5° C. The glass plate and the membrane formed on it were removed from the sodium chloride solution and the membrane was removed from the glass plate. The membrane was washed with distilled water until no sodium chloride could be detected in the washings and the membrane was stored in distilled water until tested.

The recovered membrane, which had a total thickness of 15 micrometers, was tested using an apparatus of the type hereinbefore described but omitting exit pipe 8. The membrane was placed in contact with a porous support with the exposed side of the membrane being the side exposed to the air during casting. Before being installed in the cell, the membrane was dried by being placed between tissue paper, clamped between porous polyethylene sheets and dried for 6 hours in an oven at 60° C. and a pressure of 0.2 bar. Once installed in the cell, the membrane was degassed for 16 hours at ambient temperature and at a pressure of $10^{-7}$ mbar. A gas or a gas mixture was introduced into the large section 5 of the cell to contact the exposed surface of the membrane at a pressure and a temperature as specified in the following Table One. No further gas was introduced into the cell, the test being carried out under static conditions. Prior to commencing the test, the small section 6 was connected to a vacuum pump and the pressure reduced to about $10^{-7}$ mbar. Pumping was continued at the same rate during the test and measurements were taken when the pressure in section 6 reached equilibrium. The gas passing through the membrane was analysed using a mass spectrometer. The results of several such experiments are given in Table One.

TABLE ONE

| | Feed Gas Mixture | | | | | | | |
|---|---|---|---|---|---|---|---|---|
| | Type | Pressure $(MNm^{-2})$ | Temp | Permeability (c) | | | Ratio (d) | |
| Run | (a) | (b) | (°C.) | $H_2$ | $N_2$ | $CO_2$ | 1 | 2 |
| 1 | M1 | 0.38 | 15.2 | 1.05 | | 0.4 | 95.5 | 36.3 |
| 2 | M1 | 0.38 | 16.6 | 1.37 | | 0.43 | 124.5 | 39.2 |
| 3 | $H_2$ | 0.52 | 19.0 | 1.93 | | | 175.5 | |
| 4 | $N_2$ | 0.31 | 16.3 | | 0.011 | | | |
| 5 | $N_2$ | 0.31 | 15.5 | | 0.011 | | | |
| 6 | $H_2$ | 0.38 | 15.0 | 1.82 | | | 165.5 | |
| 7 | M1 | 0.52 | 12.8 | 0.86 | | | 78.2 | |

Notes to Table One
(a) M1 is a mixture of hydrogen, nitrogen and carbon dioxide in the molar proportions of 62:21:17.
(b) The pressure is the initial pressure of the gas introduced into the cell, there is a very small drop in pressure during the course of the test.
(c) Permeability is measured by passing the permeating gas, at the equilibrium pressure, to a mass spectrometer. The units of permeability are (volume of gas permeating (in $cm^3$ at STP) for one cm thickness of membrane and for each $cm^2$ of membrane area in one second for a pressure drop of 1 cm of mercury) $\times 10^{10}$.
(d) Ratio is the permeability ratio for various pairs of gases.
1. is the ratio of the permeability of hydrogen to the permeability of nitrogen
2. is the ratio of the permeability of carbon dioxide to the permeability of nitrogen.

film of thickness 0.25 mm was formed using a brass spreader bar. The film was allowed to dry under ambient conditions and was then peeled off of the glass plate. The dry film removed from the glass plate had a thickness of 15 micro-meters. A sample of the film was used as a membrane in the manner described in Example 1.

TABLE TWO

| | Feed Gas Mixture | | | | | | | |
|---|---|---|---|---|---|---|---|---|
| | Type | Pressure $(MNm^{-2})$ | Temp | Permeability (c) | | | Ratio (d) | |
| Run | (a) | (b) | (°C.) | $H_2$ | $N_2$ | $CO_2$ | 1 | 2 |
| 1 | $N_2$ | 0.31 | 17.0 | | 0.01 | | | |
| 2 | M1 | 0.52 | 13.9 | 0.95 | | 0.42 | 95 | 41.9 |
| 3 | $H_2$ | 0.31 | 14.6 | 1.37 | | | 137 | |

Notes to Table Two
(a) (b), (c) and (d) are all as defined in Notes to Table One.

EXAMPLE 3

A sulphonated polyarylethersulphone copolymer similar to that used in Example 1 but containing 40% mole of units D and 60% mole of units E (as defined herein) having a sulphonation ratio of about 5 and a reduced viscosity of 0.95 was dissolved, at ambient temperature, in dimethylformamide to give a 27% by weight solution of the polymer in dimethylformamide.

A membrane was obtained from this solution in the manner described in Example 2. Membranes were cut from different regions of the cast sheet and consequently these membranes had somewhat different average thicknesses.

The membranes were tested as described in Example 1 and the results obtained are given in Table Three.

| | | Feed Gas Mixture | | | | | | | | |
|---|---|---|---|---|---|---|---|---|---|---|
| Run | Type | Pressure | Temp | Permeability (c) | | | | Ratio (d) | | |
| (e) | (a) | $(MNm^{-2})$ (b) | (°C.) | $H_2$ | $N_2$ | $O_2$ | $CO_2$ | 1 | 2 | 3 (f) |
| 1 | M1 | 0.52 | 14.4 | 0.79 | | | 0.33 | 132.2 | 55.6 | |
| 2 | $N_2$ | 0.31 | 15.2 | | 0.006 | | | | | |
| 3 | $H_2$ | 0.38 | 14.0 | 0.82 | | | | 137.3 | | |
| 4 | Air | 0.10 | 13.1 | | | 0.006 | 0.037 | | | 6.2 |
| 5 | $N_2$ | 0.31 | 12.3 | | 0.007 | | | | | |
| 6 | $H_2$ | 0.38 | 9.2 | 0.93 | | | | 124 | | |
| 7 | Air | 0.10 | 12.0 | | | 0.008 | 0.052 | | | 6.5 |
| 8 | M1 | 0.52 | 12.6 | 0.9 | | | 0.33 | 120 | 44 | |

Notes to Table Three
(a) (b) (c) and (d) are all as defined in Notes to Table One.
(e) Runs 1 to 4 were effected using a 20 micrometer thick membrane and runs 5 to 8 were effected using a 25 micrometer thick membrane.
(f) 3 is the ratio of the permeability of oxygen to the permeability of nitrogen.

EXAMPLE 2

A homogeneous membrane was formed from the sulphonated polyarylethersulphone copolymer used in Example 1. A 20% by weight solution of the polymer in dimethylformamide was cast on to a glass plate and a

EXAMPLE 4

The procedure of Examples 2 and 3 was repeated using a 25% by weight solution, in dimethylformamide, of a copolymer containing 10% molar of units D and 90% molar of units E, having a sulphonation ratio of about 20 and a reduced viscosity of 0.70.

TABLE FOUR

| | | Feed Gas Mixture | | | | | | | | |
|---|---|---|---|---|---|---|---|---|---|---|
| | Type | Pressure | Temp | Permeability (c) | | | | Ratio (d) | | |
| Run | (a) | $(MNm^{-2})$ (b) | (°C.) | $H_2$ | $N_2$ | $O_2$ | $CO_2$ | 1 | 2 | 3 (f) |
| 1 | $N_2$ | 0.31 | 12.6 | | 0.01 | | | | | |
| 2 | Air | 0.1 | 16.0 | | 0.01 | 0.045 | | | | 4.5 |
| 3 | M1 | 0.52 | 15.8 | 0.9 | | | 0.41 | 90 | 41 | |

TABLE FOUR-continued

| | Feed Gas Mixture | | | Permeability (c) | | | | Ratio (d) | | |
|---|---|---|---|---|---|---|---|---|---|---|
| Run | Type (a) | Pressure $(MNm^{-2})$ (b) | Temp (°C.) | $H_2$ | $N_2$ | $O_2$ | $CO_2$ | 1 | 2 | 3 (f) |
| 4 | $H_2$ | 0.38 | 14.2 | 1.07 | | | | 107 | | |

Notes to Table Four
(a) (b) (c) and (d) are all as defined in Notes to Table One.
(f) is as defined in Notes to Table Three.

COMPARATIVE EXAMPLES A AND B

Membranes were formed from unsulphonated polysulphones and were tested in the manner described in Example 1.

TABLE FIVE

| | | Feed Gas Mixture | | Permeability (c) | | | Ratio (d) | |
|---|---|---|---|---|---|---|---|---|
| Run (h) | Type (a) | Pressure $(MNm^{-2})$ (b) | Temp (°C.) | $H_2$ | $N_2$ | $CO_2$ | 1 | 2 |
| A1 | M1 | 0.58 | 15.9 | 1.71 | | 0.87 | 68.4 | 34.8 |
| A2 | $N_2$ | 0.31 | 15.0 | | 0.025 | | | |
| A3 | $H_2$ | 0.52 | 15.5 | 1.86 | | | 74.3 | |
| A4 | $N_2$ | 0.31 | 15.6 | | 0.026 | | | |
| A5 | $H_2$ | 0.52 | 15.8 | 1.85 | | | 71.2 | |
| A6 | M1 | 0.52 | 13.9 | 1.59 | | 1.01 | 61.2 | 38.8 |
| B1 | $N_2$ | 0.31 | 13.6 | | 0.125 | | | |
| B2 | $H_2$ | 0.20 | 20.6 | 6.4 | | | 51.2 | |
| B3 | M1 | 0.38 | 12.6 | 2.7 | | 1.41 | 21.6 | 11.3 |
| B4 | M1 | 0.38 | 12.4 | 1.47 | | 0.74 | 61.3 | 30.8 |
| B5 | $N_2$ | 0.31 | 13.9 | | 0.024 | | | |
| B6 | $H_2$ | 0.38 | 14.6 | 1.94 | | | 80.8 | |
| B7 | $N_2$ | 0.31 | 15.8 | | 0.08 | | | |
| B8 | $H_2$ | 0.38 | 15.7 | 2.56 | | | 32 | |
| B9 | M1 | 0.52 | 16.5 | 2.09 | | 0.98 | 26.1 | 12.3 |

Notes to Table Five
(a) (b) (c) and (d) are all as defined in Notes to Table One.
(h) In runs A1 to A6, the membrane was formed by cutting samples from a film of polyethersulphone having repeating units of the formula E, the film being available from Mitsui Toatsu. Different samples, both 50 micrometers thick, of film were used in A1 to A3 and A4 to A6.
In runs B1 to B9, the membrane was formed from polysulphone available from Union Carbide Corporation as Udel, Grade P 3500. The membrane was obtained repeating the procedure of Examples 2 and 3 using a 24% by weight solution, in methylene chloride, of Udel, Grade P 3500. Three samples were cut from the resulting cast film, Samples 1 and 2 being 25 micrometers thick and Sample 3 being 30 micrometers thick. In runs B1 to B3, the membrane used was Sample 1, in runs B4 to B6 the membrane used was Sample 3.

EXAMPLE 5

Preparation of sodium salts

A sulphonated polyarylethersulphone copolymer of the type used in the previous examples and having a sulphonation ratio of 20, 10 or 5 in the form of small beads, was washed free of traces of sulphuric acid with demineralised water.

11 g of the polymer was placed in a flask fitted with a heating jacket, stirrer and thermometer. 200 cm³ of demineralised water was added and the mixture was stirred and heated to 70° C. Aqueous sodium hydroxide solution (0.1M) was added dropwise until a pH of 8-9 was achieved and remained stable for 30 minutes.

Formation of membrane 6 g of dry, polymer beads, obtained as in the previous section, were dissolved in 15 g of dry N,N-dimethylformamide. The solution obtained was spread onto a clean glass plate at a temperature of 21° C. and a relative humidity of 55% using a spreader bar. The film was allowed to dry, protected from dust and draughts, for 24 hours at ambient temperature.

The film was then carefully removed from the glass plate and the thickness was measured at several points.

Gas permeation test

Membranes produced in the manner described in the previous section were tested in the manner described in Example 1. Further details are given in Table Six.

TABLE SIX

| | | Feed Gas Mixture | | Permeability (c) | | | | | Ratio (d) | | | |
|---|---|---|---|---|---|---|---|---|---|---|---|---|
| Run (i) | Type (a) | Pressure $(MNm^{-2})$ (b) | Temp (°C.) | $H_2$ | $N_2$ | $CO_2$ | $O_2$ | $CH_4$ | 1 | 2 | 3 (f) | 4 (j) |
| N20A | $N_2$ | 0.31 | 16.1 | | 0.012 | | | | | | | |
| N20A | Air | 0.1 | 17.6 | | 0.011 | | 0.044 | | | | 4 | |
| N20A | M1 | 0.52 | 21.6 | 0.87 | | 0.44 | | | 75.7 | 38.3 | | |
| N20B | $N_2$ | 0.31 | 16.8 | | 0.01 | | | | | | | |
| N20B | Air | 0.1 | 14.4 | | 0.008 | | 0.035 | | | | 4.4 | |
| N20B | M1 | 0.52 | 15.9 | 0.64 | | 0.33 | | | 71 | 36.7 | | |
| N10 | $N_2$ | 0.31 | 15.5 | | 0.004 | | | | | | | |
| N10 | Air | 0.1 | 19.4 | | 0.003 | | 0.016 | | | | 5.3 | |
| N10 | M1 | 0.52 | 17.2 | 0.24 | | 0.12 | | | 68.6 | 34.3 | | |
| N10 | $CH_4$ | 0.52 | 17.7 | | | | | 0.011 | | | | 10.9 |
| N5A | $N_2$ | 0.31 | 16.6 | | 0.005 | | | | | | | |
| N5A | Air | 0.1 | 15.5 | | 0.005 | | 0.02 | | | | 4 | |
| N5A | M1 | 0.52 | 17.9 | 0.61 | | 0.188 | | | 122 | 37.6 | | |
| N5A | $H_2$ | 0.52 | 18.7 | 0.84 | | | | | 168 | | | |
| N5B | $N_2$ | 0.31 | 18.6 | | 0.004 | | | | | | | |
| N5B | Air | 0.1 | 17.7 | | 0.004 | | 0.018 | | | | 4.5 | |
| N5B | M1 | 0.52 | 18.1 | 0.41 | | 0.120 | | | 102.5 | 30 | | |

TABLE SIX-continued

| Run (i) | Type (a) | Feed Gas Mixture Pressure (MNm$^{-2}$) (b) | Temp (°C.) | Permeability (c) | | | | | Ratio (d) | | | |
|---|---|---|---|---|---|---|---|---|---|---|---|---|
| | | | | H$_2$ | N$_2$ | CO$_2$ | O$_2$ | CH$_4$ | 1 | 2 | 3 (f) | 4 (j) |
| N5B | H$_2$ | 0.38 | 16.1 | 0.56 | | | | | | | 140 | |

Notes to Table Six
(a), (b) (c) and (d) are all defined in Notes to Table One
(f) is as defined in Notes to Table Three
(i) N20A is a membrane of 25 micrometers thickness formed from the sodium salt of a polymer with a sulphonation ratio of 20.
N20B is a membrane of 30 micrometer thickness formed from the sodium salt of a polymer with a sulphonation ratio of 20.
N10 is a membrane of 18 micrometers thickness formed from the sodium salt of a polymer with a sulphonation ratio of 10.
N5A is a membrane of 20 micrometers thickness formed from the sodium salt of a polymer with a sulphonation ratio of 5.
N5B is a membrane of 24 micrometers thickness formed from the sodium salt of a polymer with a sulphonation ratio of 5.
(j) 4 is the ratio of the permeability of carbon dioxide to the permeability of methane.

EXAMPLE 6

Preparation of divalent salts of polymers of high sulphonation ratio

This technique is applicable to sulphonated polyarylethersulphone copolymers having a sulphonation ratio of 5 or more, that is copolymers containing a low proportion of sulphonic acid groups.

The polymer was washed with demineralised water to remove traces of residual sulphuric acid.

A sample of the polymer of the type used in one of the previous examples was dissolved in a 3:1 by volume acetone/water mixture. A solution of a salt of the desired metal (chloride for barium and cobalt, sulphate for magnesium) was added to the polymer solution and the mixture was then refluxed. After about 60 minutes the polymer had coagulated. The mixture was treated in a blender to break down the solid, the mixture was then filtered and the solid washed and finally dried under reduced pressure at 110° C.

Preparation of divalent salts of polymers of low sulphonation ratio

This technique is used with polymers containing the repeating unit D only and having a sulphonation ratio of 2.

The dry polymer was dissolved in water by warming to about 40° C. and cooling to ambient temperature. A solution of a salt of the desired metal (for example barium chloride) was added in a substantial excess (about four times). The mixture was heated to 70° C. at which temperature a precipitate formed. The precipitate was separated as in the previous section.

Formation of membrane 5g of polymer, obtained as described in one of the previous sections, were dissolved in 15g of dry N,N-dimethylformamide.

The solution was formed into a membrane using a procedure essentially as described in Example 5.

Gas permeation test

The membranes produced in the manner described in the previous section were tested in the manner described in Example 1. Further details are given in Table Seven.

TABLE SEVEN

| Run (k) | Type (a) | Feed Gas Mixture Pressure (MNm$^{-2}$) (b) | Temp (°C.) | Permeability (c) | | | | | Ratio (d) | | | |
|---|---|---|---|---|---|---|---|---|---|---|---|---|
| | | | | H$_2$ | N$_2$ | CO$_2$ | O$_2$ | CH$_4$ | 1 | 2 | 3 (f) | 4 (j) |
| B5 | Air | 0.61 | 20 | | 0.055 | | 0.4 | | | | 7.3 | |
| B5 | Air | 0.61 | 20 | | 0.059 | | 0.42 | | | | 7.1 | |
| B5 | M2 | 0.61 | 20 | 3.34 | | 2.4 | | 0.079 | 58.6 | 42.1 | | 30.4 |
| B5 | M2 | 0.61 | 20 | 3.24 | | 2.43 | | 0.092 | 56.8 | 42.6 | | 26.4 |
| B2 | Air | 0.61 | 20.2 | | 0.011 | | 0.098 | | | | 8.9 | |
| B2 | Air | 0.61 | 20 | | 0.013 | | 0.11 | | | | 8.5 | |
| B2 | M2 | 0.61 | 20 | 1.52 | | 0.67 | | 0.0031 | 126.7 | 55.8 | | 216 |
| B2 | M2 | 0.61 | 20.1 | 1.51 | | 0.66 | | 0.0031 | 125.8 | 55 | | 213 |
| M5 | Air | 0.61 | 19.9 | | 0.029 | | 0.26 | | | | 9.0 | |
| M5 | Air | 0.61 | 19.5 | | 0.028 | | 0.27 | | | | 9.6 | |
| M5 | M2 | 0.61 | 20 | 2.40 | | 1.26 | | 0.0074 | 84.2 | 44.2 | | 170 |
| M5 | m2 | 0.61 | 20.1 | 2.36 | | 1.23 | | 0.0095 | 82.8 | 43.2 | | 129 |
| C2 | Air | 0.61 | 20 | | 0.007 | | 0.076 | | | | 10.9 | |
| C2 | M2 | 0.61 | 20 | 1.34 | | 0.44 | | 0.0017 | 191.4 | 62.9 | | 259 |

Notes to Table Seven
(a) (b) (c) and (d) are all as defined in Notes to Table One.
(f) is as defined in Notes to Table Three.
(j) is as defined in Notes to Table Six.
(k) B5 is a membrane of 45 micrometers thickness formed from the barium salt of a polymer with a sulphonation ratio of 5.
B2 is a membrane of 30 micrometers thickness formed from the barium salt of a polymer with a sulphonation ratio of 2.
M5 is a membrane of 39 micrometers thickness formed from the magnesium salt of a polymer with a sulphonation ratio of 5.
C2 is a membrane of 37 micrometers thickness formed from the cobaltous salt of a polymer with a sulphonation ratio of 2.
(1) M2 is a mixture of hydrogen, carbon dioxide and methane in the molar proportions of 15:5:80.

The values of 0.0031 and 0.0017 reported for the methane permeability indicates a low permeability at the limits of detection of the apparatus used and hence is a less accurate value.

We claim:

1. A gas separation process in which a gas feed mixture of two or more gases is contacted with a surface of a gas separation membrane and a gas, or a gas mixture having a different composition from that of the gas feed mixture, is removed from the vicinity of an opposite surface of the membrane, wherein the gas separation membrane is formed from a polyarylsulphone, where said polyarylsulphone carry groups $SO_3M$, where M is a hydrogen atom, a metal atom and/or a group $NR_4$, and wherein the groups M may be the same or different and the proportion of groups M is sufficient to combine with the unsatisfied valencies of the group —$SO_3$; where R is a hydrogen atom or an alkyl group, and where said polyarylsulphone comprises 10 mol % to 100 mol % of a polymer containing repeated units of the formula D:

$$\text{(}Ph^2\text{—O—}PH^2\text{—O—}Ph^2\text{—}SO_2\text{)} \quad \quad (D)$$

wherein,

Ph$^2$ represents phenylene residue, and

Ph$^3$ represents phenylene residue having one or two of said groups $SO_3M$.

2. The process of claim 1 wherein the ratio of the number of unsulphonated phenylene residues in the sulphonated polymer to the number of sulphonated phenylene residues in the sulphonated polymer is at least 2 and is not more than 20.

3. The process of claim 1 wherein the gas feed mixture is a mixture of gases containing hydrogen and hydrocarbon gas and a gas enriched in hydrogen, and methane if present, is removed from the vicinity of the opposite surface of the membrane.

4. A gas separation process as in claim 1 wherein M is a metal having a valency of at least 2.

5. The process of claim 4 wherein M is a divalent metal selected from the group consisting of barium, magnesium and cobalt.

6. The process of claim 1 wherein said polyarylsulphone further comprises repeating units of at least one of the formulas E:

$$\text{(}Ph^2\text{—O—}Ph^2\text{—}SO_2\text{)} \quad \quad (E)$$

and F:

$$\text{(}Ph^2\text{—O—}Ph^2\text{—O—}Ph^2\text{—}SO_2\text{)} \quad \quad (F).$$

7. The process of claim 6 wherein the polymer contains 2.5 to 67 mole % of units D and F and correspondingly 97.5 to 33 mole % of units E wherein the units D are at least 90% of the total of units D and F.

8. The process of claim 6 wherein M is a divalent metal selected from the group consisting of barium, magnesium and cobalt.

9. A gas separation process as in claim 1, wherein said gas feed mixture comprises a mixture of hydrogen and carbon dioxide and the gas or gas mixture removed from the vicinity of said opposite surface of the membrane contains an increased proportion of hydrogen.

10. A gas separation process as in claim 1, wherein said gas feed mixture comprises a mixture of nitrogen and oxygen and the gas or gas mixture removed from the vicinity of said opposite surface of the membrane contains an increased proportion of oxygen.

11. A gas separation process according to claim 10, wherein the gas separation factor for oxygen over nitrogen is between 4 and 7.

12. A gas separation process according to claim 10, wherein the gas separation factor for oxygen over nitrogen is between 4 and 11.

13. A gas separation process as in claim 1, wherein said gas feed mixture comprises a mixture of methane and carbon dioxide and the gas or gas mixture removed from the vicinity of said opposite surface of the membrane contains an increased proportion of carbon dioxide.

14. A gas separation process as in claim 13, wherein said gas feed mixture consists substantially of methane and carbon dioxide and the gas or gas mixture removed from the vicinity of said opposite surface of the membrane contains an increased proportion of carbon dioxide.

15. A gas separation process as in claim 14, wherein said gas feed mixture comprises a mixture of methane, carbon dioxide and hydrogen and the gas or gas mixture removed from the vicinity of said opposite surface of the membrane contains an increased proportion of carbon dioxide.

16. A gas separation process as in claim 13, wherein the gas separation factor for carbon dioxide over methane is 10.9 or more.

17. A gas separation process as in claim 13, wherein the gas separation factor for carbon dioxide over methane is about 26 or more.

18. A gas separation process as in claim 13, wherein the gas separation factor for carbon dioxide over methane is between about 26 and about 170.

19. A gas separation process as in claim 1, wherein said gas feed mixture comprises a mixture of nitrogen and hydrogen and the gas or gas mixture removed from the vicinity of said opposite surface of the membrane contains an increased proportion of hydrogen.

20. A gas separation process according to claim 19, wherein the gas separation factor for hydrogen over nitrogen is between 90 and 170.

21. A gas separation process according to claim 19, wherein the gas separation factor for hydrogen over nitrogen is between 90 and 200.

22. A gas separation process as in claim 1, wherein said gas feed mixture comprises a mixture of nitrogen and carbon dioxide and the gas or gas mixture removed from the vicinity of said opposite surface of the membrane contains an increased proportion of carbon dioxide.

23. A gas separation process according to claim 22, wherein the gas separation factor for carbon dioxide over nitrogen is between 40 and 75.

24. A gas separation process according to claim 22, wherein the gas separation factor for carbon dioxide over nitrogen is between 30 and 75.

* * * * *